United States Patent
Yang

(10) Patent No.: US 10,805,800 B1
(45) Date of Patent: *Oct. 13, 2020

(54) ACCESS VERIFICATION NETWORK DEVICE AND METHOD

(71) Applicant: Frank Yang, Irvine, CA (US)

(72) Inventor: Frank Yang, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/840,288

(22) Filed: Apr. 3, 2020

Related U.S. Application Data

(63) Continuation of application No. 16/418,998, filed on May 22, 2019, now Pat. No. 10,681,547.

(51) Int. Cl.
  *H04W 12/06* (2009.01)
  *H04L 29/12* (2006.01)
  *H04L 29/06* (2006.01)

(52) U.S. Cl.
  CPC ......... *H04W 12/06* (2013.01); *H04L 61/6022* (2013.01); *H04L 61/6054* (2013.01); *H04L 63/0263* (2013.01); *H04L 63/0861* (2013.01); *H04L 63/0876* (2013.01)

(58) Field of Classification Search
  USPC ............ 726/4, 2, 21, 36; 713/150, 163, 181; 380/255, 264, 276
  See application file for complete search history.

(56) References Cited

U.S. PATENT DOCUMENTS

| | | | | |
|---|---|---|---|---|
| 5,412,719 A | * | 5/1995 | Hamamoto | G08B 3/1025 380/271 |
| 5,668,879 A | * | 9/1997 | Ibaraki | H04K 1/02 380/276 |
| 6,131,160 A | * | 10/2000 | Dillon | G06F 21/10 348/E7.061 |
| 6,498,851 B1 | * | 12/2002 | Wong | H04K 1/00 380/266 |
| 7,088,825 B2 | * | 8/2006 | Sambhwani | H04B 1/70735 375/E1.005 |
| 8,112,315 B2 | * | 2/2012 | Dooley | G06Q 30/02 705/26.5 |
| 8,136,148 B1 | * | 3/2012 | Chayanam | G06F 21/31 726/5 |
| 8,731,196 B2 | * | 5/2014 | Matsuo | H04L 63/06 380/255 |

(Continued)

*Primary Examiner* — Sharif E Ullah
(74) *Attorney, Agent, or Firm* — Arman Khosraviani

(57) ABSTRACT

A computer comprising a network communication interface, at least one memory, a processor coupled to the at least one memory and configured to: receive a request parameter and one or more authentication factors from a current user through a network and the network communication interface, identify an authentication file based on the received authentication factors of the current user, a first authentication factor is compared with a first authentication file and the second authentication factor is compared with a second authentication file, based at least in part on the request parameter and authentication factors, identify a first rule set, from among a plurality of rule sets defining requirements for user authentications, based on the first rule set, obtain one or more verification parameters from the identified authentication file for authentication, at least one obtained verification parameter corresponding to biometric information of the current user.

20 Claims, 5 Drawing Sheets

(56) References Cited

U.S. PATENT DOCUMENTS

| | | | |
|---|---|---|---|
| 8,799,444 B2* | 8/2014 | Wakumoto | H04L 45/26 709/224 |
| 8,887,276 B2* | 11/2014 | Mraz | H04L 65/601 726/22 |
| 9,288,281 B2* | 3/2016 | Solter | H04L 63/126 |
| 2006/0224470 A1* | 10/2006 | Garcia Ruano | G06Q 20/102 705/26.1 |
| 2007/0178886 A1* | 8/2007 | Wang | H04W 56/00 455/411 |
| 2012/0106734 A1* | 5/2012 | Wang | H04W 36/0038 380/247 |

* cited by examiner

ACCESS VERIFICATION NETWORK DEVICE AND METHOD

CROSS-REFERENCE TO RELATED APPLICATIONS

The entire contents of the following applications are incorporated herein by reference: U.S. Nonprovisional patent application Ser. No. 15/386,670; filed on Dec. 21, 2016; and entitled AUTONOMOUS PAIRING OF INTERNET OF THINGS DEVICES. U.S. Nonprovisional patent application Ser. No. 15/454,446; filed on Mar. 9, 2017; and entitled DUAL VIDEO SIGNAL MONITORING AND MANAGEMENT OF A PERSONAL INTERNET PROTOCOL SURVEILLANCE CAMERA. Nonprovisional patent application Ser. No. 15/488,211 filed on Apr. 14, 2017; and entitled AN INTERACTIVE AUGMENTED-REALITY IoT DEVICES SYSTEMS AND METHODS. Nonprovisional patent application Ser. No. 15/490,826 filed on Apr. 18, 2017; and entitled GARAGE DOOR CONTROLLER AND MONITORING SYSTEM AND METHOD. Nonprovisional patent application Ser. No. 15/620,749 filed on Jun. 12, 2017; and entitled SMART REGISTER DEVICE AND METHOD. Nonprovisional patent application Ser. No. 15/625,601 filed on Jun. 16, 2017; and entitled SMART FAN AND VENTILATION DEVICE AND METHOD. Nonprovisional patent application Ser. No. 15/680,146 filed on Aug. 17, 2017; and entitled DETERMINING A COMMUNICATION LANGUAGE FOR INTERNET OF THINGS DEVICES. Nonprovisional patent application Ser. No. 15/703,718 filed on Jun. 5, 2017; and entitled AUTONOMOUS AND REMOTE PAIRING OF INTERNET OF THINGS DEVICES UTILIZING A CLOUD SERVICE II. Nonprovisional patent application Ser. No. 1/818,275 filed on Nov. 20, 2017; and entitled AUTOMATED SMART DOORBELL DEVICE AND METHOD. Nonprovisional patent application Ser. No. 15/835,985 filed on Dec. 8, 2017; and entitled AUTONOMOUS AND REMOTE PAIRING OF INTERNET OF THINGS DEVICES UTILIZING A CLOUD SERVICE. Nonprovisional patent application Ser. No. 15/888,425 filed on Feb. 5, 2018; and entitled SMART PANEL DEVICE AND METHOD. Nonprovisional patent application Ser. No. 15/888,425 filed on Feb. 5, 2018; and entitled SMART PANEL DEVICE AND METHOD. Nonprovisional patent application Ser. No. 15/944,696 filed on Apr. 3, 2018; and entitled SMART TRACKER DEVICE AND METHOD. Nonprovisional patent application Ser. No. 16/056,276 filed on Aug. 6, 2018; and entitled SMART CAM DEVICE AND METHOD. Nonprovisional patent application Ser. No. 16/219,626 filed on Dec. 13, 2018; and entitled SYSTEM AND METHOD FOR CONNECTING A NETWORK CAMERA. Nonprovisional patent application Ser. No. 16/372,053 filed on Apr. 1, 2019; and entitled SMART ACTIVE CAMERA DEVICE AND METHOD.

FIELD

The present disclosure generally relates to a communication system for electronic devices to identify, verify, and authenticate a user, device, or entity, and more particularly, to interconnecting verified entities and users with verified devices through an aggregate network that populates and validates devices, entities, and users using multiple identification factors.

BACKGROUND

With the increasing popularity of smart devices and advanced mobile device verification using fingerprint or face recognition. In recent years, consumers have become more comfortable providing biometric information to a mobile device to verify their identity to a service provider. Subsequently, service providers have opted to request advanced mobile device verification from users to simplify account access and improve online transactions or rapidly connect users to an ecommerce site. Once a user verifies their identity using their account credentials, they may opt to use advanced mobile verification for future access.

Following widespread consumer acceptance of advance mobile verification, various identity verification services have proliferated offering diverse custom solutions for verifying access to various everyday services, for example, accessing a facility, office, vehicle, mailbox, payment processing and verification, or other smart device access and operation. Advanced mobile verification enables users to quickly connect to a service, facility, or device without resorting to a username, password, date of birth, or other personally verifiable information.

While advanced mobile verification methods help mitigate unauthorized account access, many existing smart devices, public facilities, ecommerce sites, and shops lack implementation of advanced verification. Moreover, users are required to carry and operate their mobile devices to provide user authentication. And while advanced mobile verification can verify user account credentials and access, many online services offer account access using account credentials taken from a social media account, an email account, or various other online platforms or apps that may/could be compromised. Consequently, there is a need for a platform to interconnect verified entities and users with verified devices using multiple identification factors.

SUMMARY

The disclosed subject matter relates to a computer device and method. The computer comprising a network communication interface, at least one memory, a processor, coupled to the at least one memory, the processor is configured to: receive a request parameter and one or more authentication factors from a current user, receive a device identification as a first authentication factor through a network and the network communication interface, and receive a user identification as a second authentication factor through the network and the network communication interface. The user identification includes biometric information from the current user, identify a first authentication file based on the received device identification, and a second authentication file based on the received user identification of the current user.

The first authentication factor is compared with a first authentication file and the second authentication factor is compared with a second authentication file, based at least in part on the request parameter, user identification, and the device identification, the computer identifies a first rule set, from among a plurality of rule sets defining requirements for user authentications, based on the first rule set and obtains one or more verification parameters from the identified authentication file for authentication. At least one obtained verification parameter corresponding to biometric information of the current user, authenticate the current user as the valid user based on a successful comparison of the one or more obtained reference factors to a corresponding one or more of the user authentication factors received for authentication, and in response to the authentication of the current user as the valid user, transmit data via the communication interface and the network to enable completion of the request parameter of the current user.

The disclosed subject matter further relates to a method comprising receiving a request parameter from a current user, collecting one or more authentication factors by one or more sensor modules of an electronic device, verifying, by the electronic device, one or more authentication factors, determining, by the electronic device, an operations list based on the one or more authentication factors, performing an operation, based on the request parameter and verification of the one or more authentication factors, by the electronic device, and storing, by the electronic device, the current user request parameter and verified authentication factors in a database.

The disclosed subject matter further relates to a non-transitory machine-readable medium comprising instructions stored therein, which, when executed by one or more processors of a processing system cause the one or more processors to perform operations comprising receiving a request parameter from a current user, collecting one or more authentication factors by one or more sensor modules of an electronic device, verifying, by the electronic device, one or more authentication factors, determining, by the electronic device, an operations list based on the one or more authentication factors, performing an operation, based on the request parameter and verification of the one or more authentication factors, by the electronic device, and storing, by the electronic device, the current user request parameter and verified authentication factors in a database.

It is understood that other configurations of the present disclosure will become readily apparent to those skilled in the art from the following detailed description, wherein various configurations of the present disclosure are shown and described by way of illustration. As will be realized, the present disclosure of other different configurations and its several details are capable of modifications in various other respects, all without departing from the subject technology. Accordingly, the drawings and the detailed description are to be regarded as illustrative in nature and not restrictive.

BRIEF DESCRIPTION OF THE DRAWINGS

Certain features of the present disclosure are set forth in the appended claims. However, for purpose of explanation, several implementations of the present disclosure are set forth in the following figures.

Figure 1:
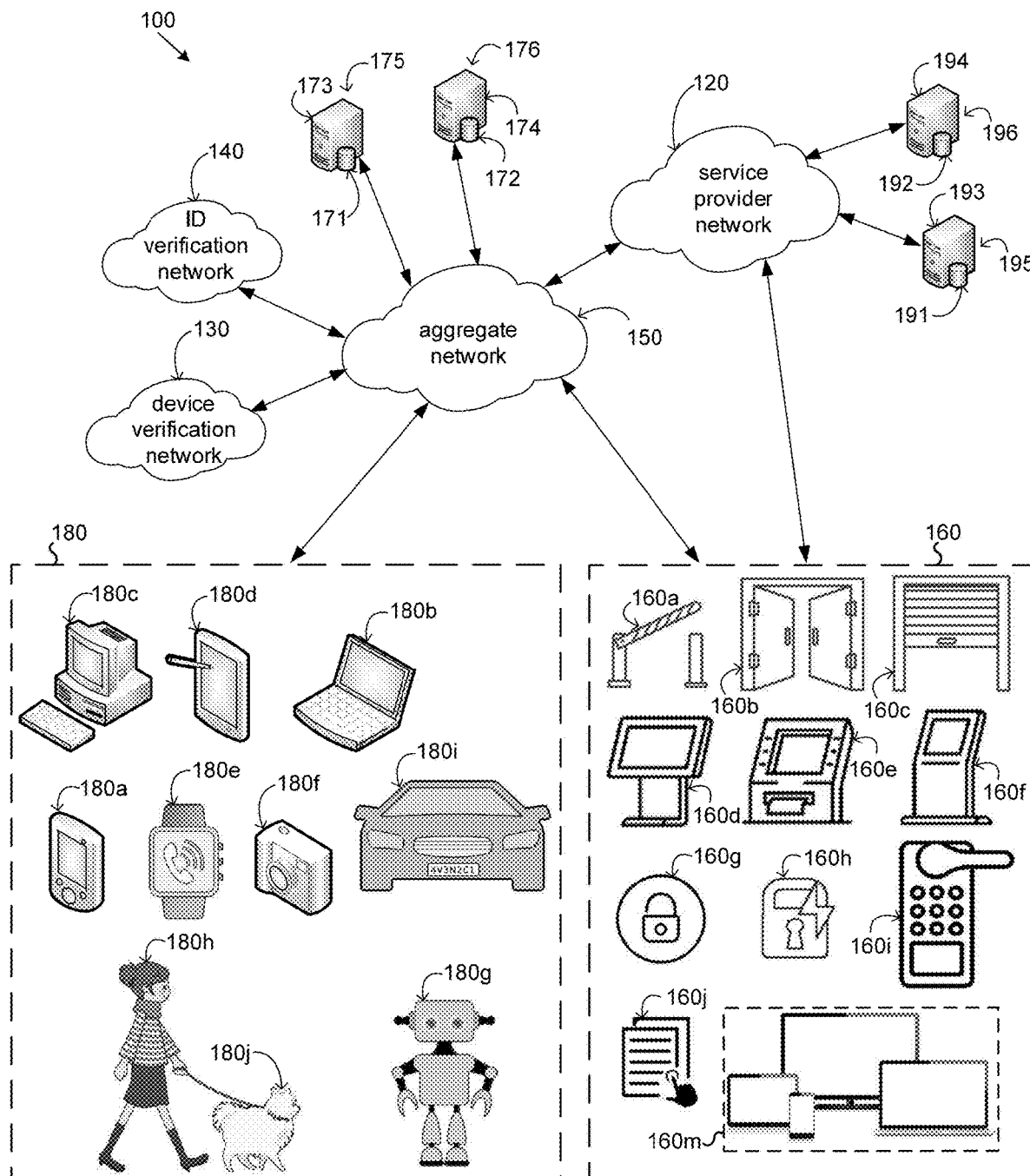
FIG. 1 illustrates an exemplary embodiment of an aggregate network system communicating with service provider device and corresponding service provider network and device and user identification networks to perform verification of an entity in accordance with one or more exemplary embodiments of the present disclosure.

Embodiments of the present disclosure and their advantages are best understood by referring to the detailed description that follows. It should be appreciated that like-reference-numerals are used to identify like-elements illustrated in one or more of the figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to better illustrate details and features of the present disclosure.

Various features of the present disclosure will now be described and is not intended to be limited to the embodiments shown herein. Modifications to these features and embodiments will be readily apparent to those skilled in the art, and the principles defined herein may be applied to other embodiments without departing from the scope of the disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

As shown in FIG. 1, the technologies discussed for the aggregate verification system 100 of the present disclosure pertain to improving techniques to authenticate an entity 180 in an effective manner to provide personalized access to a public or private service group 160, for example, electronic document signature 160*j*, network connected public device 160*m*, public or private gate 160*a*, electronic lock 160*i*, user device account access 160*h*, user device transaction authorization 160*g*, member/ticketing system 160*e*, travel or information kiosk 160*f*, moveable barrier 160*c*, door 160*b*, customer or web services computing device 160*d*, and the like. An entity 180 may include, for example, an individual 180*h*, wearable device 180*e*, autonomous or semi-autonomous robot 180*g* or vehicle 180*i*, camera 180*f*, mobile device 180*a*, tablet 180*d*, machine 180*c*, or pet 180*j*. The vehicle 180*i* may be any mechanical or electric vehicle for transporting or moving an individual 180*h* or pet 180*j*.

The aggregate verification system 100 may include electronic devices of entity 180, for example, wearable device 180*e*, autonomous or semi-autonomous robot 180*g* or vehicle 180*i*, camera 180*f*, mobile device 180*a*, tablet 180*d*, and machine 180*c* that may be used to collect numerous device identifiers. Device identifiers, may include (but not be limited to), device location information, for example, Global Positioning System (GPS), serial number, electronic serial number (ESN), a mobile equipment identifier (MEID), Device ID (DID), an international mobile subscriber identity (IMSI), make, device id, client id, model, Internet Protocol (IP) address, Media Access Control (MAC) address, operating system, ownership information, personal information of owners or administrators, chipset information, etc. Device identifiers may be communicated to one or more networks, for example, aggregate network 150, device verification networks 130, ID verification networks 140, or service provider networks 120 for authentication using one or more network communication standards as described in the present disclosure and as is known in the art.

The aggregate verification system 100 may further collect numerous identification parameters from one or more individuals 180$h$, pets 180$j$, autonomous or semi-autonomous robots 180$g$ or vehicles 180$i$ of entity 180. Identification parameters may include (but not be limited to), visual, audible, biometric information, voice recognition, include structural properties: body shape, height, appearance, height, color, physical and temporary property or residence address, among other readily recognizable features. For autonomous or semi-autonomous robot 180$g$ or vehicle 180$i$ features that may be used as identification parameters may include structural properties: shape, body, appearance, color, vehicle title, engine sound, registration, and ownership information, identifying tags or plates, robot 180$g$ or vehicle 180$i$ identification number, among other readily recognizable features. For pet 180$j$ identification parameters may include structural properties: shape, sound, body, appearance, height, color, pet registration and ownership information, identifying tags, among other readily recognizable features. Individual features, environmental features, environmental conditions, and environmental activity as disclosed in CROSS-REFERENCED RELATED APPLICATIONS, for example, SMART CAM DEVICE AND METHOD (application Ser. No. 15/625,601), and SMART REGISTER DEVICE AND METHOD (application Ser. No. 16/219,626) may be provided in addition to identification parameters and touch or non-touch entity interactions ascertained by one or more electronic devices of entity 180 and/or devices of the service group 160. The identification parameters may be communicated to one or more networks, for example, aggregate network 150, device verification networks 130, ID verification networks 140, or service provider networks 120 for authentication using one or more network communication standards as described in the present disclosure and as is known in the art.

An individual 180$h$ of the aggregate verification system 100 may make one or more touch or non-touch interactions with an electronic device of entity 180, for example, mobile device 180$a$ and wearable device 180$e$. The interactions may be processed as a request, and the appropriate identification parameters for the device and individual (entity 180) may be communicated to one or more networks, for example, aggregate network 150, device verification networks 130, ID verification networks 140, or service provider networks 120 for authentication. After authentication, the aggregate network 150 or service provider network 120 communicates with the appropriate service group 160 based on the entity 180 request and interaction and provides the entity with the appropriate service, access, product, or completes the request.

In some exemplary embodiments, service group 160 of the aggregate verification system 100 may include, or may be modified to include, components of one or more electronic devices of entity 180 capable of collecting visual, audible, and biometric information. For example, moveable barrier 160$c$ may include camera 180$f$ and tablet 180$d$ to process touch or non-touch entity interactions and collect identification parameters, environmental features, and environmental activity based on the request. The moveable barrier 160$c$ may then communicate to one or more networks, for example, aggregate network 150, device verification networks 130, ID verification networks 140, or service provider networks 120 for authentication. After authentication, the aggregate network 150 or service provider network 120 communicates with the moveable barrier 160$c$ to provide the entity 180 with the appropriate service, access, product, or completes the request. The moveable barrier 160$c$ may then process the request to open or close. In some exemplary embodiments, service group 160 may complete the authentication process without connecting to a network using a combination of verification parameters, for example, stored or learned user behaviors and patterns, biometric information, device identifiers, identification parameters, environmental features, and environmental activity based on the request.

In general, verification techniques of the exemplary aggregate verification system 100 for authenticating entity 180 and entity request to service group 160 may range from minimal verification parameters to comprehensive device and individual (entity 180) identification analysis. Depending on the level of security needed by a service group or service provider to ensure secure access to the appropriate authenticated users, the devices of entity 180 and service group 160 may store or learn verification parameters onsite or on device to facilitate immediate access to device or user behaviors and patterns, biometric information, device identifiers, identification parameters, environmental features, and environmental activity to provide entity 180 with the appropriate service, access, product, or complete entity requests. Therefore, depending on the entity request and level of authentication desired by service group 160, devices of entity 180 may collect and store as much identifiable information as needed with minimal touch or non-touch entity interaction or processing times. This allows seamless interaction of machine-to-machine and human-to-machine requests using a combination of stored or network accessible verification parameters, for example, device or user behaviors and patterns, biometric information, device identifiers, identification parameters, environmental features, and environmental activity to provide the entity 180 with the appropriate service, access, product, or complete a request.

The aggregate verification system 100 may include ID verification network 140 to periodically, consistently, or frequently retrieve, compare, and update individual 180$h$ biometric information and identification parameters. The ID verification network 140 may comprise of one or more local and global companies or government agencies servers capable of validating individual 180$h$ biometric information, physical address and personal information, real ID identity verification, as well as providing recent information on criminal activities.

The aggregate verification system 100 may include device verification network 130 to periodically, consistently, or frequently retrieve, compare, and verify entity 180 and service group 160 device identifiers. The device verification network 130 may comprise of one or more local and global companies' servers capable of validating electronic devices of entity 180 and service group 160 using device identifiers.

The aggregate verification system 100 may include aggregate network 150 to periodically, consistently, or frequently retrieve, compare, and verify entity 180 and service group 160 through one or more verification parameters. While in some exemplary embodiments, the appropriate verification parameters may be verified in real-time using ID verification network 140, device verification network 130, and service provider network 120. The aggregate network 150 may store and update entity 180 and service group 160 verification parameters and authentication information collected from one or more networks, for example, aggregate network 150, device verification networks 130, ID verification networks 140, or service provider networks 120 on servers 175 and 176 for immediate future entity requests and authentication.

Servers 175 and 176 may include computing devices 173 and 174 and computer-readable storage devices 171 and 172. Server 175 may be any system or device having a processor, a memory, and communications capability for providing content and/or services to the aggregate network 150, entity 180, and service group 160, for example. In some exemplary embodiments, the server 175 may include a single computing device 173, for example, or may include more than one computing device working together to perform the actions of a server (e.g., cloud computing, server farm). Further, the server 175 may represent various forms of servers including, but not limited to, a web server, an application server, a proxy server, etc.

Similarly, server 176 may be any system or device having a processor, a memory, and communications capability for providing content and/or services to the aggregate network 150, entity 180, and service group 160. In some exemplary embodiments, the server 176 may be a single computing device 174, for example, or may include more than one computing device working together to perform the actions of a server (e.g., cloud computing, server farm). Further, the server 176 may represent various forms of servers including, but not limited to, a web server, an application server, a proxy server, etc.

A cloud-based service may include services provided by one or more servers, such as server 175 and server 176, via one or more networks, such as aggregate network 150. Cloud-based services may require authentication of user account credentials for access via a cloud-based application, such as a web-based personal portal, a web-based email application, etc. A cloud-based service has access to computer-readable storage devices 171 and 172 and may store information or data of a user once the user account credentials are authenticated. The stored data or information is also available to the user for future access and possible manipulation via other applications that are employed by the user.

The aggregate verification system 100 may include service provider network 120 to periodically, consistently, or frequently retrieve, compare, and verify entity 180 and service group 160 through one or more verification parameters. In some exemplary embodiments, the verification parameters for the service provider network 120 may be limited to device identifiers, environmental features, and environmental activity. To ascertain a higher level of security required from an entity 180, the service provider network 120 may request additional verification parameters from the aggregate network 150. The aggregate network 150 may access one or more networks, for example, device verification networks 130, or ID verification networks 140 for authentication, as well as other collected servers 195 and 196 to obtain more verification parameters from previous touch or non-touch entity interactions and requests, including real ID verification and real-time user verification.

Servers 195 and 196 may include computing devices 193 and 194 and computer-readable storage devices 191 and 192. Server 195 may be any system or device having a processor, a memory, and communications capability for providing content and/or services to the aggregate network 150, entity 180, and service group 160, for example. In some exemplary embodiments, the server 195 may include a single computing device 193, for example, or may include more than one computing device working together to perform the actions of a server (e.g., cloud computing, server farm). Further, the server 195 may represent various forms of servers including, but not limited to, a web server, an application server, a proxy server, etc.

Similarly, server 196 may be any system or device having a processor, a memory, and communications capability for providing content and/or services to the aggregate network 150, entity 180, and service group 160. In some exemplary embodiments, the server 196 may be a single computing device 194, for example, or may include more than one computing device working together to perform the actions of a server (e.g., cloud computing, server farm). Further, the server 196 may represent various forms of servers including, but not limited to, a web server, an application server, a proxy server, etc.

A cloud-based service may include services provided by one or more servers, such as server 195 and server 196, via one or more networks, such as aggregate network 150. Cloud-based services may require authentication of user account credentials for access via a cloud-based application, such as a web-based personal portal, a web-based email application, etc. A cloud-based service has access to computer-readable storage devices 191 and 192 and may store information or data of a user once the user account credentials are authenticated. The stored data or information is also available to the user for future access and possible manipulation via other applications that are employed by the user.

The aggregate network system 100 of the present disclosure provides for a verifiable, comprehensive, and immediate entity authentication for daily use devices, products, and services to improve authentication and security for customers and providers. With improved security, many types of transactions are possible on the fly throughout many industries, for example, notary, identification, and security services, electronic signatures, global travel, retail, telecommunications, gaming, social media, transportation, parks, libraries, and recreational services, shipping/delivery, financial institutions, and various other merchants and customers requiring identity verification to conduct business or provide public access.

To receive the appropriate service, access, or product utilizing service group 160, an entity 180 may provide a touch or non-touch interaction and verification parameters to service group 160. In some exemplary embodiments, verification parameters for both service group 160 and entity 180 may be collected by aggregate network 150 to verify ownership and authenticate access to one or more individuals 180*h*, pets 180*j*, and robots 180*g* and vehicles 180*i*.

As stated above, service group 160 may be capable of directly collecting verification parameters from entity 180 or capable of receiving verification parameters from an electronic device of entity 180 through one or more networks, for example, aggregate network 150, device verification networks 130, ID verification networks 140, or service provider networks 120 for authentication.

Figure 2A:
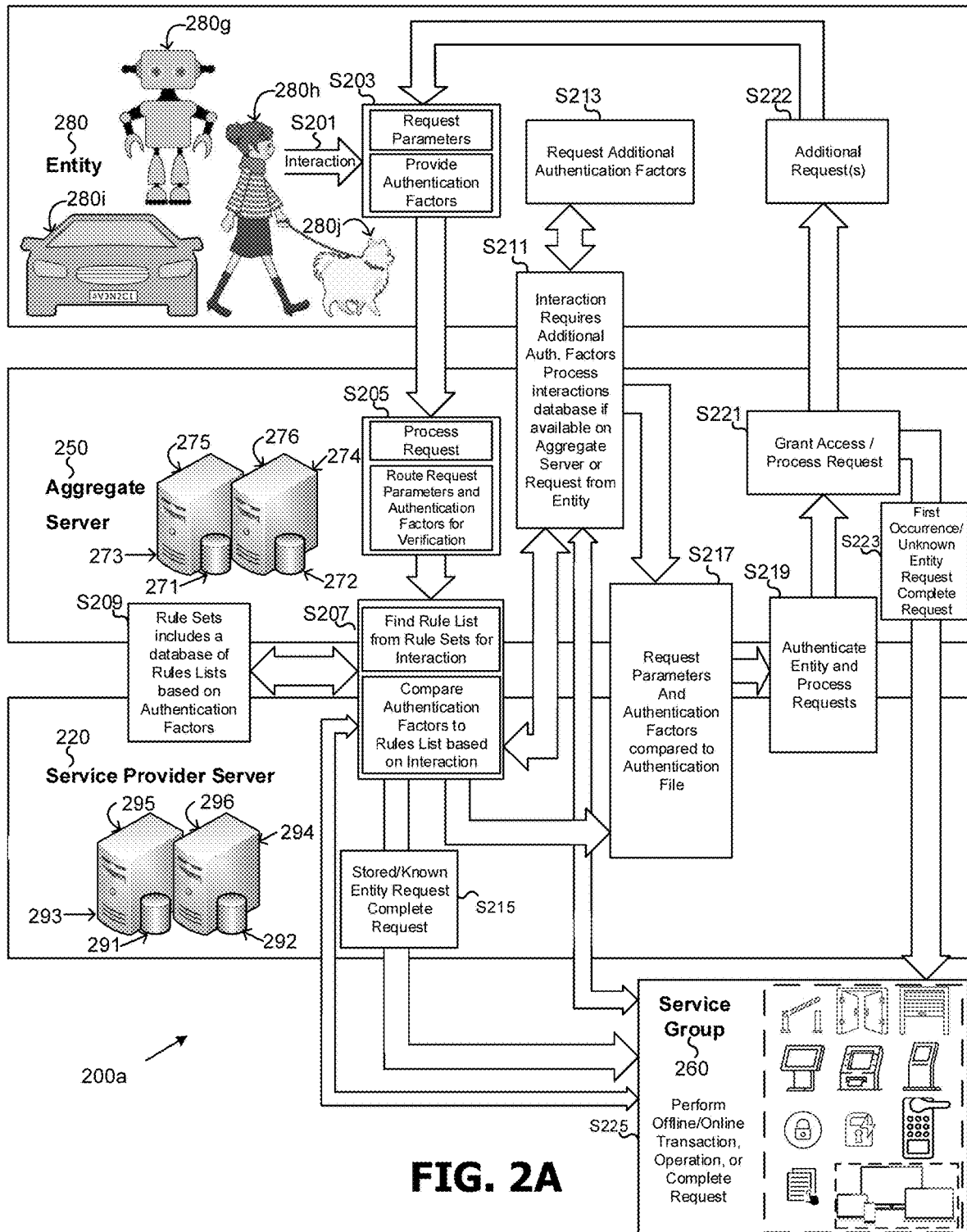
FIG. 2A illustrates an exemplary embodiment of a block diagram of interactions and operations of the aggregate server, service provider server, and entity of the aggregate network system in accordance with one or more exemplary embodiments of the present disclosure.

Referring to FIG. 2A, provides a block diagram illustration of entity interactions and verification of the entity 180 and service group 160, the exemplary interaction sequence may be between entity 280, aggregate server 250, and service provider server 220 of aggregate verification system 200a. For illustration purposes, interactions of entity 280 may include interactions from vehicle 280i, pet 280j, individual 280h, and robot 280g. Individual 280h interactions may include touch and non-touch interactions, for example, fingerprint, retinal scan, facial and image recognition, other biometric information, audible information, body size, color, and shape, posture, and the like. Pet 280j interactions may include non-touch interactions, for example, audible information, image recognition, other biometric information, body size, color, and shape, audible information, posture, and the like. Moreover, pet 280j interactions may include device information such as tags, biomarkers, embedded chips, and the like. For robot 280g and vehicle 280i identification parameters, as described above, may be used in addition to service request location or GPS location information to further verify robot 280g and vehicle 280i for each request made to an aggregate server 250.

It should be noted, for each instance where an entity 280 communicates with a service provider server 220 or aggregate server 250, the interaction, request, and verification result may be stored on servers 275 and 276 or computer-readable storage devices 271 and 272. For future verification, the verification parameters communicated for every previous request and interaction by an entity 280 or service group 260 may be stored and verified on the aggregate server 250, and then communicated to the service provider server 220 or any other device verification network 130, or ID verification networks 140.

At step S201, the entity interaction may be communicated to an electronic device of entity 280 or service group 260. At step S203, the entity interaction may include one or more request parameters (e.g. service, access, or product request) and one or more authentication factors (e.g. verification parameters) communicated to aggregate server 250. At step S205, aggregate server 250 may process one or more interactions, and determine whether authentication parameters may be verified, in part or in whole, by aggregate server 250 or service provider server 220 in steps S207, S209, S217, S219. In some exemplary embodiments, entity 280 or service group 260 may store or learn verification parameters onsite or on device to facilitate immediate access to device or user behaviors and patterns, biometric information, device identifiers, identification parameters, environmental features, and environmental activity to provide entity 280 with the appropriate service, access, product, or complete entity requests.

At step S207, the aggregate server 250 may process request parameters and authentication factors from entity interaction at step S201 to determine the appropriate rule set for authenticating entity 280 or service group 260. Each rule set having one or more verification parameters and request parameters (e.g. device identifiers, identification parameters, environmental features, and environmental activity, etc.) corresponding to an entity 280 or service group 260.

In some exemplary embodiments, routine or scheduled entity interactions at step S201 with electronic devices of entity 280 or service group 260 may communicate known or expected request parameters and authentication factors. In such as case, as shown in step S215, the known or expected request parameters and authentication factors may be stored on and readily accessible from servers 275 and 276 or computer-readable storage devices 271 and 272 of aggregate server 250, servers 295 and 296 or computer-readable storage devices 291 and 292 of service provider server 220, or computer-readable storage devices of electronic devices of entity 280 or service group 260. Upon receiving known entity interactions at step S201 (known entity 280, verification parameters, and request parameters), the aggregate server 250 or electronic devices of entity 280 or service group 260 may process the request an provide the appropriate service, access, product. At step S225, the service group 260 may perform the transaction, operation, or complete the request made by entity 280 at step S201.

At step S209, the aggregate server 250 may find the rule set on servers 275 and 276 or computer-readable storage devices 271 and 272, or the service provider server 220 may find the rule set on servers 295 and 296 or computer-readable storage devices 291 and 292. The rule set may include a database of one or more rules lists, each rules list corresponding to each operation that may be performed by devices of entity 280 or service group 260. At step S207, when the appropriate rule set is retrieved, the request parameters and authentication factors may be used by the aggregate server 250 or service provider server 220 to determine the appropriate rules list for verifying entity 280 and service group 260. The request parameters and authentication factors are compared with the appropriate rules list.

At step S211, in the event verification parameters collected from entity interaction at step S201 fail to meet a threshold for verifying entity 280, the aggregate server 250 or service provider server 220 may request additional verification parameters from electronic devices of entity 280 or service group 260. The verification parameters may be stored on aggregate server 250, service provider server 220, device verification networks 130, or ID verification networks 140. Moreover, in the event the aggregate server 250 or service provider server 220 determine additional authentication factors are required based on the request parameters and rules list, the aggregate server 250 or service provider server 220 may request additional verification parameters from electronic devices of entity 280 or service group 260.

In some exemplary embodiments, aggregate server 250 may store daily, weekly, or monthly interactions in an interactions database. The interactions database may include a history of validated entity interactions for entity 280 or service group 260. The validated entity interactions may include verification parameters and request parameters of entity 280 or service group 260 that were processed and completed to provide the appropriate service, access, or product. Electronic devices of entity 280 or service group 260 may independently store daily, weekly, or monthly interactions in an interactions database accessible to aggregate server 250. The interactions database may be stored on servers 295 and 296 or computer-readable storage devices 291 and 292 of aggregate server 250. The interactions database may allow aggregate server 250 to compare current entity interactions with prior entity interactions to substantiate entity verification. In instances where electronic devices of entity 280 or service group 260 is unable to collect or substantiate entity verification. At step S213, additional authentication factors may be requested from the entity 280 or service group 260.

At step S217, for each verified interaction from entity 280, an authentication file corresponding to verification parameters and request parameters may be stored on aggregate server 250, electronic devices of entity 280, or service group 260. The authentication file may be retrieved by aggregate server 250, electronic devices of entity 280, or service group 260 to verify entity 280 or service group 260 in future entity interactions.

As part of an authentication procedure, the aggregate server 250 or service provider server 220 may identify an authentication file based on the received request parameters and authentication parameters. The aggregate server 250 may periodically, consistently, or frequently retrieve, compare, and verify entity 280 and service group 260 through one or more verification parameters to update the authentication file. The verification parameters may be stored and updated one or more networks, for example, service provider server 220, device verification networks 130, or ID verification networks 140.

Generally, the authentication file on service provider server 220 may relate to an entity 280 or service group 260 specifically produced, bound, or serviced by the service provider server 220. The aggregate server 250, however, may collect and add to a database each entity 280 account or service group 260 account from various service provider servers 220, and the corresponding authentication factors supported by entity 280 or service group 260. The aggregate server 250 may create rule sets and rules list based on collected authentication files and entity interactions. The rule set may include a database of one or more rules lists, each rules list corresponding to each operation that may be performed by devices of entity 280 or service group 260. Thus, aggregate server 250 may collect verification parameters from multiple entity 280 accounts and multiple service group 260 accounts to update an authentication file.

At step S219, the authentication file is used to authenticate the entity 280 or service group 260 and process the request from interaction at step S201. If the electronic devices of entity 280 or service group 260 provide additional functions or operations that require additional interactions, at step S221, the aggregate server 205 may request the entity 280 or service group 260 to provide additional interactions prior to completing the interaction of step S201.

If no further interactions are requested, the entity request is completed at step S223 and the service group 260 processes the request and provides the appropriate service, access, transaction, operation, or product, or combination thereof.

Figure 2B:
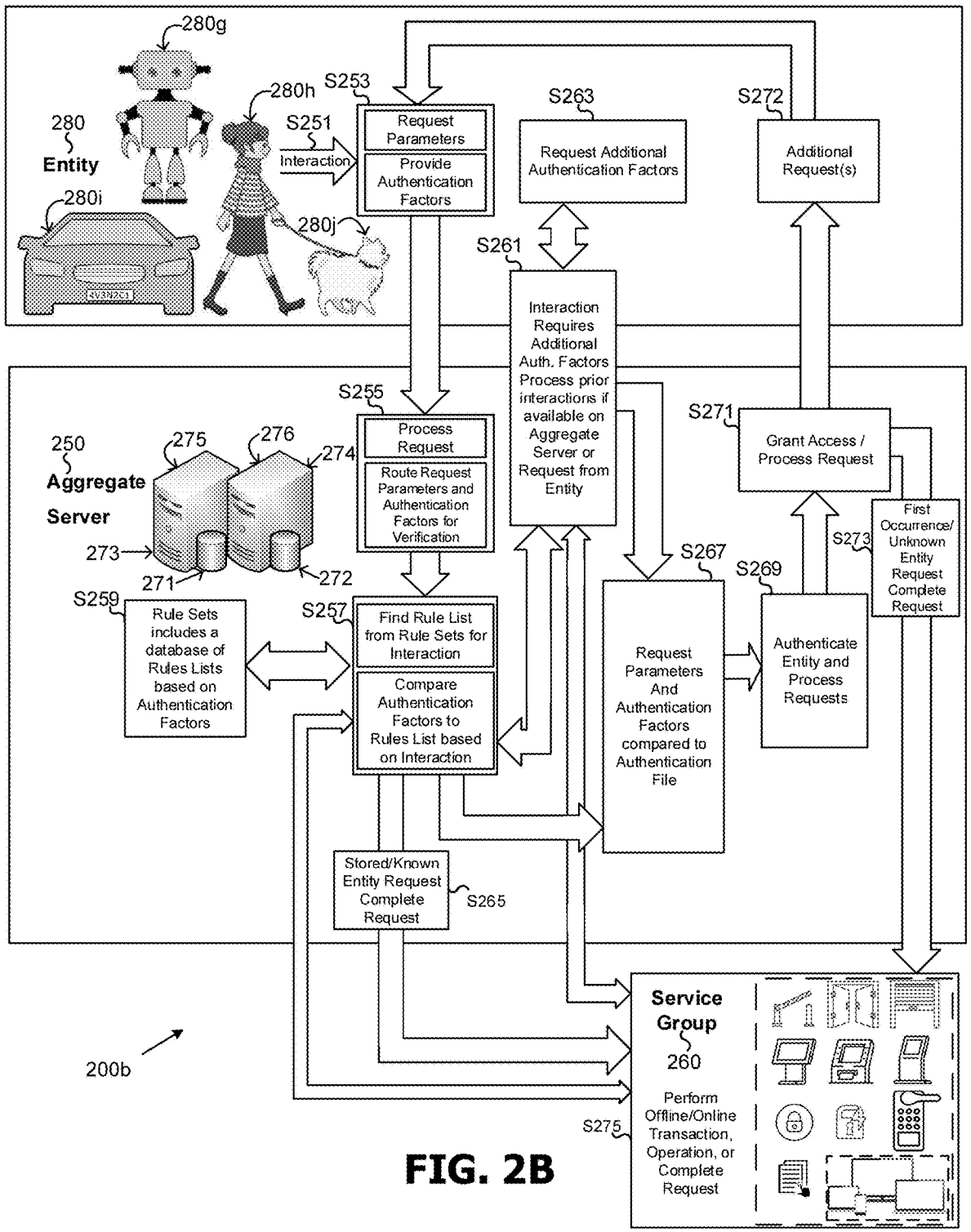
FIG. 2B illustrates an exemplary embodiment of a block diagram of interactions and operations of the aggregate server and entity of the aggregate network system in accordance with one or more exemplary embodiments of the present disclosure.

FIG. 2B provides an exemplary block diagram illustration of entity interactions and verification of the entity 180 and service group 160. The exemplary interaction sequence may all occur between entity 280 and aggregate server 250 of the aggregate verification system 200*b*. In the aggregate verification system 200*b*, steps S207, S209, S217, S219 of FIG. 2A, are all processed on aggregate verification system 200*b*. For illustration purposes, interactions of entity 280 may include interactions from vehicle 280*i*, pet 280*j*, individual 280*h*, and robot 280*g*. Individual 280*h* interactions may include touch and non-touch interactions, for example, fingerprint, retinal scan, facial and image recognition, other biometric information, audible information, body size, color, and shape, posture, and the like. Pet 280*j* interactions may include non-touch interactions, for example, audible information, image recognition, other biometric information, body size, color, and shape, audible information, posture, and the like. Moreover, pet 280*j* interactions may include device information such as tags, biomarkers, embedded chips, and the like. For robot 280*g* and vehicle 280*i* identification parameters, as described above, may be used in addition to service request location or GPS location information to further verify robot 280*g* and vehicle 280*i* for each request made to an aggregate server 250.

It should be noted, for each instance where an entity 280 communicates with aggregate server 250, the interaction, request, and verification result may be stored on servers 275 and 276 or computer-readable storage devices 271 and 272. For future verification, the verification parameters communicated for every previous request and interaction by an entity 280 or service group 260 may be stored and verified on the aggregate server 250, and then communicated to and verified between other device verification network 130, or ID verification networks 140.

At step S201, the entity interaction may be communicated to an electronic device of entity 280 or service group 260. At step S203, the entity interaction may include one or more request parameters (e.g. service, access, or product request) and one or more authentication factors (e.g. verification parameters) communicated to aggregate server 250. In some exemplary embodiments, entity 280 or service group 260 may store or learn verification parameters onsite or on device to facilitate immediate access to device or user behaviors and patterns, biometric information, device identifiers, identification parameters, environmental features, and environmental activity to provide entity 280 with the appropriate service, access, product, or complete entity requests.

At step S207, the aggregate server 250 may process request parameters and authentication factors from entity interaction at step S201 to determine the appropriate rule set for authenticating entity 280 or service group 260. Each rule set having one or more verification parameters and request parameters (e.g. device identifiers, identification parameters, environmental features, and environmental activity, etc.) corresponding to an entity 280 or service group 260.

In some exemplary embodiments, routine or scheduled entity interactions at step S201 with electronic devices of entity 280 or service group 260 may communicate known or expected request parameters and authentication factors. In such as case, as shown in step S215, the known or expected request parameters and authentication factors may be stored on and readily accessible from servers 275 and 276 or computer-readable storage devices 271 and 272 of aggregate server 250, or computer-readable storage devices of electronic devices of entity 280 or service group 260. Upon receiving known entity interactions at step S201 (known entity 280, verification parameters, and request parameters), the aggregate server 250 or electronic devices of entity 280 or service group 260 may process the request an provide the appropriate service, access, product. At step S225, the service group 260 may perform the transaction, operation, or complete the request made by entity 280 at step S201.

At step S209, the aggregate server 250 may find the rule set on servers 275 and 276 or computer-readable storage devices 271 and 272, or computer-readable storage devices 291 and 292. The rule set may include a database of one or more rules lists, each rules list corresponding to each operation that may be performed by devices of entity 280 or service group 260. At step S207, when the appropriate rule set is retrieved, the request parameters and authentication factors may be used by the aggregate server 250 to determine the appropriate rules list for verifying entity 280 and service group 260. The request parameters and authentication factors are compared with the appropriate rules list.

At step S211, in the event verification parameters collected from entity interaction at step S201 fail to meet a threshold for verifying entity 280, the aggregate server 250 may request additional verification parameters from electronic devices of entity 280 or service group 260. The verification parameters may be stored on aggregate server 250, device verification networks 130, or ID verification networks 140. Moreover, in the event the aggregate server 250 determine additional authentication factors are required based on the request parameters and rules list, the aggregate server 250 may request additional verification parameters from electronic devices of entity 280 or service group 260.

In some exemplary embodiments, aggregate server 250 may store daily, weekly, or monthly interactions in an interactions database. The interactions database may include a history of validated entity interactions for entity 280 or service group 260. The validated entity interactions may include verification parameters and request parameters of entity 280 or service group 260 that were processed and completed to provide the appropriate service, access, or product. Electronic devices of entity 280 or service group 260 may independently store daily, weekly, or monthly interactions in an interactions database accessible to aggregate server 250. The interactions database may be stored on servers 295 and 296 or computer-readable storage devices 291 and 292 of aggregate server 250. The interactions database may allow aggregate server 250 to compare current entity interactions with prior entity interactions to substantiate entity verification. In instances where electronic devices of entity 280 or service group 260 is unable to collect or substantiate entity verification. At step S213, additional authentication factors may be requested from the entity 280 or service group 260.

At step S217, for each verified interaction from entity 280, an authentication file corresponding to verification parameters and request parameters may be stored on aggregate server 250, electronic devices of entity 280, or service group 260. The authentication file may be retrieved by aggregate server 250, electronic devices of entity 280, or service group 260 to verify entity 280 or service group 260 in future entity interactions.

As part of an authentication procedure, the aggregate server 250 may identify an authentication file based on the received request parameters and authentication parameters. The aggregate server 250 may periodically, consistently, or frequently retrieve, compare, and verify entity 280 and service group 260 through one or more verification parameters to update the authentication file. The verification parameters may be stored and updated one or more networks, for example, device verification networks 130, or ID verification networks 140.

Generally, the authentication file on an entity 280 or service group 260 may be specifically produced, bound, or serviced by service provider server 220. The aggregate server 250, however, may collect and add to a database each entity 280 account or service group 260 account from various service provider servers 220, and the corresponding authentication factors supported by entity 280 or service group 260. The aggregate server 250 may create rule sets and rules list based on collected authentication files and entity interactions. The rule set may include a database of one or more rules lists, each rules list corresponding to each operation that may be performed by devices of entity 280 or service group 260. Thus, aggregate server 250 may collect verification parameters from multiple entity 280 accounts and multiple service group 260 accounts to update an authentication file.

At step S219, the authentication file is used to authenticate the entity 280 or service group 260 and process the request from interaction at step S201. If the electronic devices of entity 280 or service group 260 provide additional functions or operations that require additional interactions, at step S221, the aggregate server 205 may request the entity 280 or service group 260 to provide additional interactions prior to completing the interaction of step S201.

If no further interactions are requested, the entity request is completed at step S223 and the service group 260 processes the request and provides the appropriate service, access, transaction, operation, or product, or combination thereof.

Figure 3:
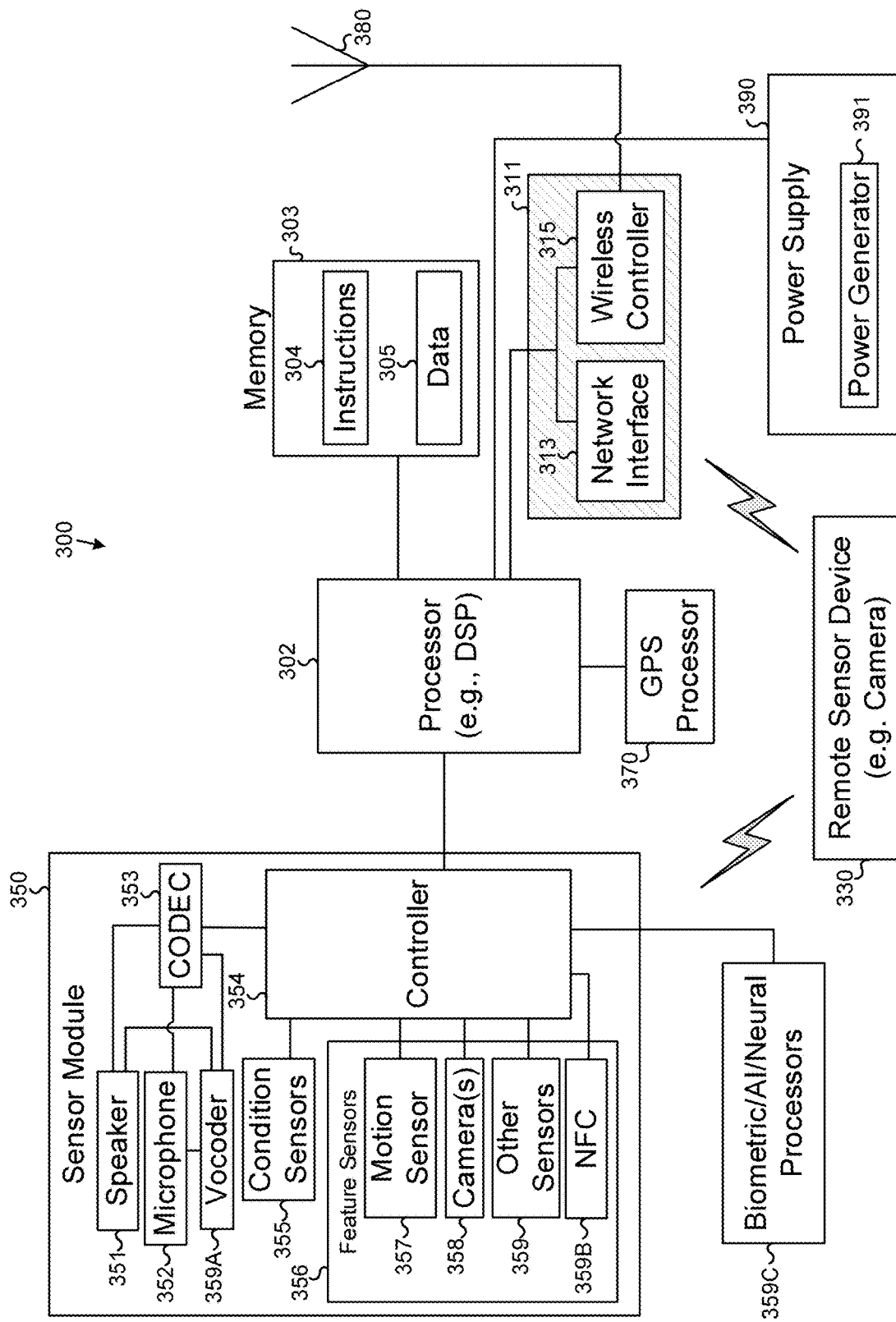
FIG. 3 illustrates an exemplary embodiment of the internal components of the aggregate network sensor system in communication with the aggregate network system in accordance with one or more exemplary embodiments of the present disclosure.
Figure 4:
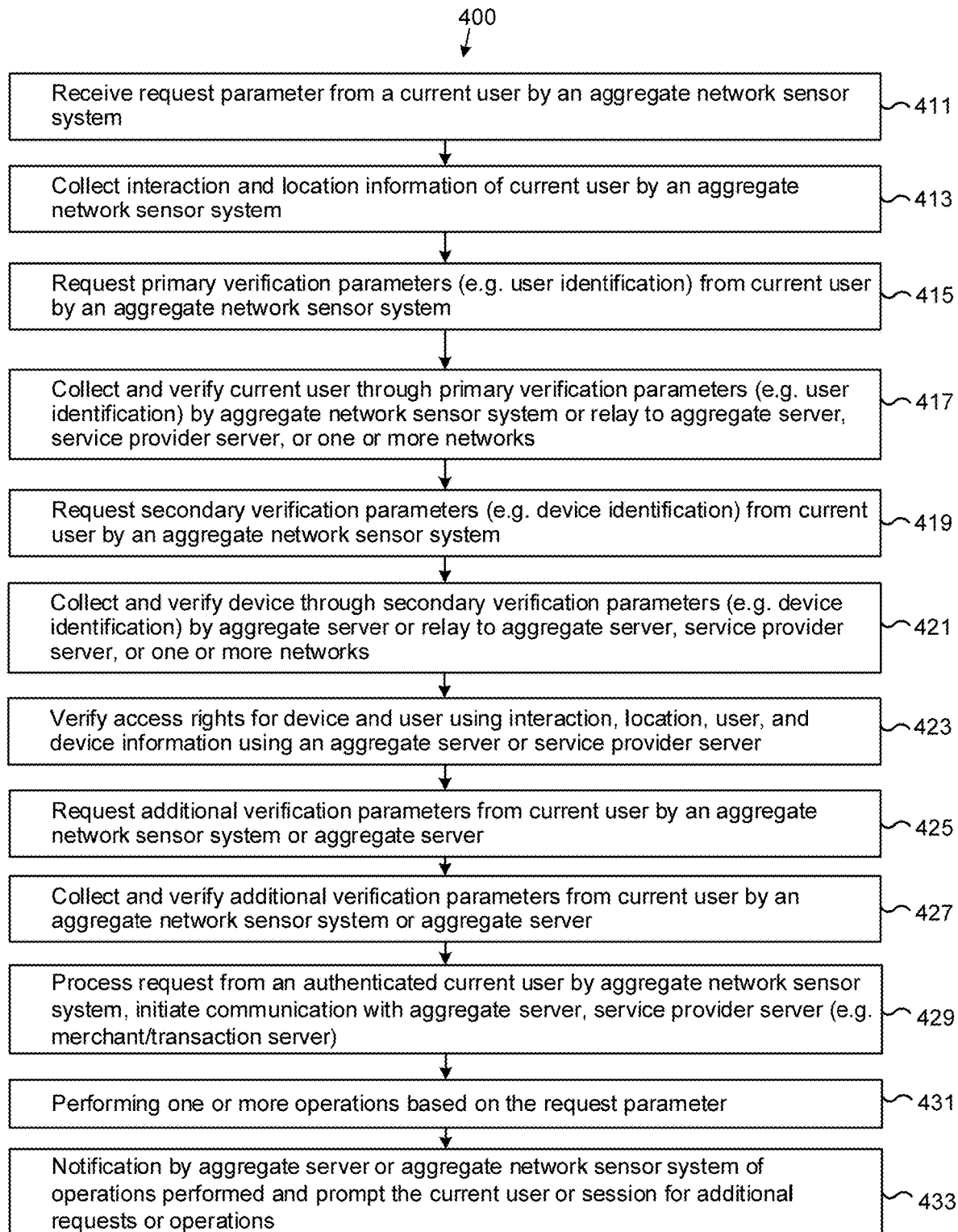
FIG. 4 illustrates an exemplary embodiment of a flowchart of interactions and operations of the aggregate network system in accordance with one or more exemplary embodiments of the present disclosure.

FIG. 3 illustrates conceptually an exemplary aggregate network sensor system 300 with which some exemplary embodiments of the present disclosure may be implemented. In some exemplary embodiments, components of electronic devices of entity 280 or service group 260 may include, in part or in whole, the aggregate network sensor system 300, the sensor module 350 to collect verification parameters, and/or appropriate hardware and communication capabilities for processing collected user interactions, inputs, and verification parameters. Still, in some exemplary embodiments, electronic devices of entity 280 or service group 260 may comprise of components of aggregate network sensor system 300 to collect appropriate verification parameters. The aggregate network 300 may communicate user interactions and verification parameters collected from entity 280 and service group 260 to an aggregate network 250. It should be appreciated that the disclosed subject matter may be implemented using essentially any computing device having appropriate hardware and communication capabilities for collecting user interactions or inputs.

The aggregate network sensor system 300 may include any computing device having various touch and non-touch input devices for authenticating an entity 180 (e.g. using biometric sensing capability) and performing an operation by a service group 180 based on the entity interaction and the verification parameters used to authenticate the entity 180. For purposes of this discussion, entity interactions and one or more networks of FIG. 1 and FIGS. 2A-2B may be referred to for collecting verification parameters of entity 180 and service group 160. As discussed in the present disclosure, service provider network 120, device verification network 130, or ID verification networks 140 may provide verification parameters for authenticating entity 180 and service group 160. The aggregate network 150 may store and periodically, consistently, or frequently verify the validity of the verification parameters.

The exemplary aggregate network sensor system 300 may be any sort of electronic device that transmits signals over a network, such as electronic devices embedded in smart appliances, vehicles, electronic devices, and other smart systems. The exemplary aggregate network sensor system 300 may include various types of computer readable media (e.g., a non-transitory computer-readable medium) and interfaces for various other types of computer readable media. The exemplary aggregate network sensor system 300 may include one or more cameras 358 and may be communicably coupled to one or more remote sensor devices 330. The remote sensor devices 330 may contain, in part or in whole, components of sensor modules 350 and to facilitate collection of verification parameters of one or more entity 180 or service group 160. The aggregate network sensor system 300 may comprise of an electronic device having a processor, memory, network interface, GPS, power supply, etc., communicably coupled to one or more sensors, for example, remote sensor devices 330 or sensor modules 350. Service group 260, electronic devices of entity 180, and aggregate network sensor system 300 may be used interchangeably in the present disclosure.

The exemplary aggregate network sensor system 300 includes a processor 302 and memory/storage 303. The processor 302 may retrieve and execute instructions 304 and/or data 305 from memory/storage 303 to perform the processes of the present disclosure. Processor 302 may be a single processor, a multi-core processor, or multiple processors in different implementations.

Instructions and data for operating aggregate network sensor system 300 may be stored on, transmitted from, or received by any computer-readable storage medium (e.g., memory/storage of remote sensor devices 330, electronic devices of entity 180, or service group 160) storing data (e.g., data 305) that is accessible to a processor (e.g., the processor of remote sensor devices 330, electronic devices of entity 180, or service group 160) during modes of operation of the aggregate network sensor system 300. The aggregate network sensor system 300 may access and execute instructions 304 and/or data 305 stored on any remote computing device (e.g. remote sensor devices 330). The data 305 may be a method instruction as depicted in FIGS. 4A-43. The method instructions are executable by processor 302, where the instructions include steps on how to remotely operate and configure one or more remote sensor devices 330, electronic devices of entity 180, or service group 160.

The memory/storage 303 may include a dynamic random-access memory (DRAM) and/or a read-only memory (ROM). Memory/storage 303 may provide a temporary location to store data 305 and instructions 304 retrieved and processed by processor 302. Memory/storage 303 may include a non-volatile read-and-write memory that stores data 305 and instructions 304, even when Wi-Fi/Internet is off, that may be retrieved and processed by processor 302. For example, memory/storage 303 may include magnetic, solid state and/or optical media, memory/storage 303 may be a single or multiple memory units as necessary. The memory/storage 303 stores all collected verification parameters and environmental conditions (e.g. visual, audio, textual, voice, motion, heat, temperature, humidity, air quality, proximity, etc.) provided directly from the aggregate network sensor system 300 or the one or more remote sensor devices 330, or indirectly through a wireless connection to another electronic device(s), sensor(s), or sensor module(s) 350 (e.g. another remote computing device comprised of one or more sensors).

The exemplary aggregate network sensor system 300 couples to a network through a network interface 313. In some aspects, network interface 313 is a machine-interface. In this manner, the aggregate network sensor system 300 may be a part of a network of computers, a local area network (LAN), a wide area network (WAN), or an Intranet. or a network of networks, for example, the Internet. A wireless controller 315 may be coupled to the processor 302. The wireless controller 315 may be further coupled to an antenna 380. The network module 311 may be integrated as system-in-package or system-on-chip device and/or collectively defined as having the network interface 313 and wireless controller 315. Network interface 313 and wireless controller 315 integrated into the network module 311 and being coupled to an antenna 380. Any or all components of aggregate network sensor system 300 may be used in conjunction with the subject disclosure. The network interface 313 may include cellular interfaces, WiFi™ interfaces, Infrared interfaces, RFID interfaces, ZigBee interfaces, Near-Field Communication (NFC), Bluetooth interfaces, Ethernet interfaces, coaxial interfaces, optical interfaces, radio communication interfaces, or generally any communication interface that may be used for device communication.

A sensor module 350 may be communicably coupled to the exemplary aggregate network sensor system 300. The sensor module 350 may be coupled to aggregate network sensor system 300, formed on aggregate network sensor system 300, or remotely connected to aggregate network sensor system 300. The sensor module 350 may include and control various sensor components for sensing verification parameters and environmental conditions (e.g. temperature, humidity, air quality, smoke, CO, $CO_2$, etc.). Sensor components may monitor environmental conditions and appropriately adjust sensors to collect verification parameters, for example, vehicle plates, facial recognition, body and color, etc., by using one or more condition sensors 355, motion sensors 357, cameras 358, and other sensors 359 (e.g. heat, occupancy, lighting, ambient lighting, etc.). Motion sensors 357 may include, for example, orientation, velocity, acceleration, heading, direction, or axis of the aggregate network sensor system 300.

The aggregate network sensor system 300 may collect additional verification parameters from one or more remote sensor devices 330. The sensor modules 350, aggregate network sensor system 300, and remote sensor devices 330 may collect media or media information which may be defined as including, for example, interior and exterior environmental conditions, visual, spatial, and audio information, infrared, near-infrared, ultrasonic, radio frequency, and microwave signals, etc. The level of detail or number of verification parameters required may be configured, preset, or preselected by the service group 160. The electronic devices of entity 180 may collect additional verification parameters based on the capabilities of the service group 160 or electronic devices of entity 180, or based on daily, weekly, or monthly history of user behavior and entity interactions as stored on the electronic devices of entity 180, service group 160, or aggregate network sensor system 250.

A combination of sensor components may be implemented to provide comprehensive collection of verification parameters, entity interactions, video and audio monitoring, and improved accuracy in environmental monitoring to account for interior and exterior environmental conditions which may introduce aberrations, artifacts, or anomalies. Moreover, individual sensor components from sensor module 350 may be separately coupled to aggregate network sensor system 300, formed on aggregate network sensor system 300, or remotely connected to aggregate network sensor system 300. In some exemplary embodiments, some sensor components may be grouped together to form a second or additional sensor modules. In certain embodiments, some sensor components of sensor module 350 (e.g. motion sensor 357) may instead be formed on the aggregate network sensor system 300. Further, in some embodiments, some sensor components of sensor module 350 (e.g. infrared sensor, other sensors 359) may also be formed on the aggregate network sensor system 300 to provide additional or supplemental monitoring.

Referring to FIG. 1, FIGS. 2A-2B, and FIG. 4, data collected from sensor components ("sensory data") of aggregate network sensor system 300 may be used together with sensory data from the one or more cameras 358 and/or the one or more remote sensor devices 330 for collecting and substantiating verification parameters and entity interactions (e.g. selecting a closer camera 180f for collecting a license plate of vehicle 180i, or hair, skin tone, and body dimensions of individual 180h or pet 180j). The aggregate network sensor system 300 may collect additional verification parameters based on prior entity interactions between an entity 180 and service group 160. Moreover, an entity interaction from entity 180 may provide verification parameters to one or more sensor modules 350 or aggregate network sensor systems 300 for verifying, creating, deleting, or updating an entity profile, one or more rule sets, or one or more rule lists. In some exemplary embodiments, entity 180 may provide additional verification parameters to one or more sensor modules 350 or aggregate network sensor systems 300.

In the event a service group 160 or electronic device of entity 180 lacks adequate hardware or software to collect and process verification parameters (e.g. biometric information), the aggregate network sensor system 300 may use previously collected sensory data from entity 180, service group 160, and entity interactions as stored on aggregate server 250 or service provider server 220 to determine whether one or more secondary verification parameters (e.g. height, body size, color, clothes, etc.) may be substituted for primary verification parameters (e.g. fingerprint, facial recognition). Then, upon verification of one or more secondary verification parameters of entity 180 on aggregate server 250, aggregate network sensor system 300 may provide access, operate, send notifications, perform a financial transaction, or complete a request. For example, individual 180h may attempt to operate smart lock 160i to open or close using biometric information, for example, facial recognition. The facial recognition verification on smart lock 160i, aggregate network 150, or service provider network 120 may fail to process within a predetermined amount of time due to various factors or limitations, for example, the individual's 180h distance from smart lock 160i, environmental factors such as ambient lighting, and software, power, or hardware limitations of smart lock 160i. In some exemplary embodiments, the owner of smart lock 160i may desire additional verification parameters based on these limitations. The entity 180 may provide primary verification parameters to smart lock 160i, using, for example, the aggregate server 250 entity interactions history or one or more aggregate network sensor systems 300 having suitable software, power, or hardware to provide primary verification parameters.

The current entity 180 location and validated entity interactions history may be used by the aggregate network sensor system 300 to learn or predict user behavior. Aggregate network sensor system 300 may use learned or predicted user behavior to relay verification parameters to other electronic devices of entity 180 or service group 160. The network sensor system 300 may relay entity 180 verification parameters, for example, physical address and personal information, real ID identity verification, as well as providing recent information on criminal activities to other aggregate network sensor system 300 to inhibit or prevent further crime, damage, or negligent behavior. The aggregate network sensor system 300 may take such collected sensory information and prioritize device operation or complete requests based on entity location and validated entity interactions history and learned or predicted user behavior.

Condition sensors 355 may detect and collect information about environmental conditions within a predetermined distance from the entity 180 or service group 160. Condition sensors 355 may include but not be limited to, for example, temperature sensor, ambient light sensor, humidity sensor, barometer sensor, air quality sensor (e.g. for detecting allergens, gas, pollution, pollen, etc.), infrared sensor, $CO_2$ sensor, CO sensor, piezoelectric sensor, airflow or airspeed sensor. The sensor components 355-359, etc., may be used by the processor 302 of the aggregate network sensor system 300 to determine how to operate or when to access remote sensor devices 330.

Other sensors 359 may detect and collect information about environmental features within a predetermined distance from the entity 180 or service group 160. Other sensors 359 may include, for example, a proximity sensor, occupancy sensor, ambient light sensor. Other sensors 359 may include additional sensors for facilitating biometric information collection of entity 180, for example, voltaic cells, glucose-monitoring sensors, embeddable, implantable, and ingestible sensors, chemical or biosensors, and wearable sensors.

Microphone 352 and speaker 351 may be used to collect entity interactions and an audible verification parameter from entity 180 or service group 160. For example, entity 180 may make audible requests to aggregate network sensor system 300, for example, to create an account or access an account on a customer or web services computing device 160d that provides facility services based on verification parameters.

The verification parameters may be selected based on a variety of transactions, operations, and entity request. As with any other transaction or entity request, for transactions related services (e.g. financial transactions), some verification parameters, may be passed to the service provider server 220 (e.g. the merchant) if required, otherwise the aggregate network server 250 may process the transaction, in part or in whole, to collect transaction amount, identify merchant, and process the transaction. The verified entity 180 or service group 160 and entity interaction may be verified by the aggregate network sensor system 300, the aggregate network server 250, or the service provider server 220. The service provider server 220 may subsequently process the transaction after receiving a verified entity request as described in FIGS. 2A-2B.

The aggregate network sensor system 300 may use physical location of the entity 180 or service group 160 as determined by methods such as GPS data, identification of the nearest cell tower, code transmitted by a Bluetooth beacon or WiFi access point, for example, as determined and sent from the electronic devices of entity 180 or service group 160 during entity interactions and collection of verification parameters. The electronic devices of entity 180 or service group 160 may obtain location information by other means, for example, short range wireless communication and near field communication (NFC) for collecting entity interactions and verification parameters for transaction processing.

The sensor module 350 or remote sensor device 330 may include short range wireless communication interfaces, including an NFC module 359B, to establish radio communication with other such devices in close proximity. In some exemplary embodiments, electronic devices of entity 180 and service group 160 may include short range wireless communication interfaces such as an NFC. Due to its short range and support for encryption, NFC communication is suitable for secure communication over short distances. The NFC module 359B may include a transceiver, an antenna, and an NFC sensor configured to communicate with other NFC capable devices. The NFC module 359B provides two-way wireless communication of information in accordance with NFC technology and protocols for transmitting and receiving NFC communications to/from other NFC compatible devices over short air link distances. Entity interactions may send and receive a variety of signaling messages for establishing NFC links with other NFC-enabled devices to send verification parameters over the established NFC links. The signaling, may establish an entity interaction from entity 180 and service group 160 to establish an NFC link to send and/or receive data for verifying an entity 180 or service group 160.

The sensor module 350 or remote sensor device 330 may further include voice communication or voice recognition as a verification parameter. The microphone 352 and speaker 351 may be communicatively coupled to a voice or audio encoder/decoder (vocoder) 359A. The vocoder 359A provides two-way conversion between analog audio signals representing speech or other audio and digital samples at a compressed bit rate compatible with the digital protocol of wireless telephone network communications or voice over packet (e.g., Internet Protocol) communications. The vocoder 359A may be used as additional verification parameters for entity 180 or service group 160. Collected voice communication may be processed by vocoder 359A, compressed at codec 353, and sent to controller 354 for processing voice communication into voice samples.

The processor 302 may retrieve and execute instructions 304 and/or data 305 from memory/storage 303 to compare voices samples with voice recognition samples or data. Upon verification of entity 180 or service group 160 through voice recognition samples, the aggregate server 150 may then process the entity request. Moreover, the vocoder 359A may be used as an entity interaction interface to collect speech input information from entity 180 or service group 160, elements of the user interface during other operations of the device, including some types of transaction communications. For example, audible prompts may be output via the speaker. The microphone 352 and vocoder 359A may be used for voice input and voice communication verification parameter in addition to one or more verification parameters collected by the sensor module 350 or remote sensor device 330.

The sensor module 350 includes a controller 354 for controlling sensors 355-359B and processing data collected by the sensors. Controller 354 may include a processor, memory/storage device (storing sensor instructions, settings, etc.), and a network module wireless chip for directly communicating with one or more remote sensor devices 330 connected to the network. Controller 354 may send measured/detected environmental conditions from remote sensor device 330 and cameras 358 to processor 302 for further processing. Alternatively, processor 302 may send measured/detected environmental conditions from one or more remote sensor devices 330 to controller 354 for further processing, or processor 302 may allocate or share processing power of sensory data with controller 354. Controller 354 may then send control commands to processor 302, or directly to remote sensor devices 330, to operate or access one or more remote sensor devices 330.

One or more cameras 358 of aggregate network sensor system 300 may also collect entity interactions, verification parameters, biometric information, and visual information such as video and still images of the surrounding environment of entity 180 or service group 160. The one or more cameras 358 may be coupled to controller 354 for determining how to operate one or more remote sensor devices 330 to capture visual information, entity interaction, or verification parameters from entity 180 or service group 160 that may be sent to the processor 302. The controller 354 may be coupled to the processor 302 for processing visual information. The processor 302 may provide visual information captured from camera 358 to any electronic device which may facilitate interaction or communication with a person or an object positioned within a vicinity of the aggregate network sensor system 300. The camera 358 may be any optical instrument for recording or capturing images that may be stored locally, transmitted to another location, or both. The images may be still photographs, or sequences of images forming videos or movies. The camera 358 may be any type of camera, for example, high-end professional camera type, digital camera, panoramic camera, fish-eye lens type camera, multi-lens type camera, VR camera, etc. The camera 358 may collect visual information, for example, facial features, palm features, fingerprint, handprint, retinal features, and other personally identifiable information for biometric, visual, and genomic information of an entity 180.

The sensor module 350 may be powered by a power supply 390. The power from the power supply 390 may be provided by disposable batteries or rechargeable batteries, for example, nickel cadmium (NiCd), lithium (Li), AA, AAA, and/or rechargeable capacitors, for example, supercapacitors (SC) or ultracapacitors. The power supply 390 may supply power to sensor module 350 by, for example, a power adapter for connecting to an outlet, a solar panels/cell, or any other renewable/alternative power supply source. The sensor module 350 may use multiple battery types, for example, using a coin cell battery to operate some sensor components or to provide auxiliary power.

The sensor module 350 may include a speaker 351 and microphone 352 for communicating with a user or receiving control commands from a user positioned within a vicinity of the aggregate network sensor system 300. The speaker 351 and microphone 352 may be coupled to a CODEC 353. The coder/decoder (CODEC) 353 may also be coupled to the vocoder 359A for compressing speech input or voice communications. The coder/decoder (CODEC) 353 may also be coupled to the processor 302 through a controller 354. The processor 302 may provide audio information captured from the microphone 352 to any electronic device (e.g. remote sensor devices 330), that may facilitate communication with an entity 180 or service group 160 positioned within a vicinity of one or more remote sensor devices 330.

In an exemplary embodiment, the aggregate network sensor system 300 and/or sensor module 350 comprises at least one motion sensor 357 for detecting motion information. For example, motion sensor 357 may detect moving objects, pets, and/or pedestrians. The motion sensor 357 may be a passive infrared motion detector. Infrared motion sensors are also known as PIR (passive infrared) motion sensors or simply PIR sensors. Such detectors have about a 120° arc and about a 50-foot range detection zone. In the case where an increased field of view of motion detection or more accurate motion detection is required, two or more motion detectors may be used.

Suitable alternate motion detectors may also be used, such as ultrasonic, optical, microwave, or video motion detectors. Additional alternative types of motion detectors may also be used to sense intrusion including laser scanning or frequency sensitive detectors, commonly referred to as "glass breaks". Motion sensor 357 may include image sensors having any type of low light level imaging sensors used for surveillance and unmanned monitoring in daylight to complete darkness, for example, low-light complementary metal-oxide-semiconductor (CMOS) or charge-coupled device (CCD) image sensors.

The motion sensor 357 may also be complemented with other devices to aid in detecting motion such as, for example, photocell sensors, cadmium-sulfide (CdS) cells, light-dependent resistors (LDR), and photoresistors. In addition to motion sensors, the photo cell sensors may be used to determine if there something in front of a sensor or a series of sensors that block light. The sensitivity of the motion sensor and photocell may be adjusted through, for example, an application on an electronic device (e.g. smart device or laptop). Also, a server or application may decide if the situation or application warrants night use or twenty-four-hour operation of motion detection through alternate means such as photocell sensors. If night operation is selected, then the server or application will process detected photocell information to determine if motion was detected.

The sensor module 350 may include any number of other detectors or other sensors 359. Examples of other sensors 359 that may be used include, by way of illustration only and not by way of limitation, temperature sensors, video cameras, audio recorders, motion sensors, ambient light sensors, light sensors, humidity sensors, smoke detectors, and other sensors, such as for example, an Electric Field Proximity Sensing (EFPS) sensor to determine whether a person or object is nearby that is behind a wall.

The aggregate network sensor system 300 includes a power supply 390 having a power generator 391 as a power source. The power generator 391 may include rechargeable batteries, for example, nickel cadmium (NiCd), lithium (Li), AA, AAA, and/or rechargeable capacitors, for example, supercapacitors (SC) or ultracapacitors. The power generator 391 may comprise of multiple battery types, for example, using a coin cell battery to operate some sensor components or to provide auxiliary power, while using a rechargeable Li battery to provide power for operating sensor module 350.

The exemplary one or more remote sensor devices 330 of the present disclosure need not be limited to simple camera components, for example, a microphone, speaker, and lens. The one or more remote sensor devices 330 may comprise of all components of sensor module 350 for collecting entity interactions and verification parameters of entity 180 and service group 160.

FIG. 4A illustrate a first exemplary method 400 of using the aggregate network sensor system 300 in accordance with one or more embodiments of the present disclosure. Method may apply to other exemplary embodiments of the network camera system device as disclosed in FIGS. 1-3. Method 400A may be used independently or in combination with other methods or process for operating one or more electronic devices of entity 180, devices of service group 160, more remote sensor devices 330, remote cameras, computing devices, smart devices, or other electronic devices or components. For explanatory purposes, the example process 400 is described herein with reference to aggregate network sensor system 300. The aggregate network sensor system 300 collecting one or more interactions and verification parameters from an entity 180. The aggregate network sensor system 300 may process the collected interactions and verifications parameters locally or relay the data to be stored and updated on one or more networks, for example, aggregate server 250, service provider server 220, device verification networks 130, or ID verification networks 140. The example process 400 is not limited to electronic devices of entity 180, devices of service group 160, more remote sensor devices 330, and the example process 400 may be performed by one or more computing devices, smart devices, or other electronic devices or components as disclosed in the cross-referenced applications incorporated by reference. Further for explanatory purposes, the blocks of the example process 400 are described herein as occurring in serial, or linearly. However, multiple blocks of the example process 400 may occur in parallel. In addition, the blocks of the example process 400 may be performed a different order than the order shown and/or one or more of the blocks of the example process 400 may not be performed. Further, any or all blocks of example process 400 may further be combined and done in parallel, in order, or out of order.

Each block shown in FIG. 4A represents one or more processes, methods or subroutines, carried out in the exemplary method. FIGS. 1-3 show exemplary embodiments of carrying out the methods of FIG. 4A for detecting, collecting, processing, and transmitting information. The exemplary method may begin at block 411.

Referring to FIG. 4A, the exemplary method of using the aggregate network sensor system 300 may begin with block 411 of receiving a request parameter from a current user or session by an aggregate network sensor system 300. The current user or session may be created by an entity interaction or request from an electronic device of entity 180 or service group 160. The request parameter may include input or interaction information and verification parameters collected by aggregate network sensor system 300. The collected entity interactions and requests together with location information of current user or session may then be collected at block 413. At block 415, the aggregate network sensor system 300 requests primary verification parameters (e.g. user identification) based on the authentication requirements of service group 160 for a current user or session. At block 417, the aggregate network sensor system 300 collects and verifies current user through verification parameters either locally based on stored and updated information on aggregate network sensor system 300, or the aggregate network sensor system 300 may communicate with one or more networks to verify, update, or store the data on, for example, aggregate server 250, service provider server 220, device verification networks 130, or ID verification networks 140.

At block 419, the aggregate network sensor system 300 may request secondary verification parameters (e.g. device identifiers, users list, ownership information) based on the authentication requirements of service group 160 for a current user or session. At block 421, the aggregate network sensor system 300 collects and verifies current user through verification parameters either locally based on stored and updated information on aggregate network sensor system 300, or the aggregate network sensor system 300 may communicate with one or more networks to verify, update, or store the data on, for example, aggregate server 250, service provider server 220, device verification networks 130, or ID verification networks 140.

At block 423, aggregate server 250 or service provider server 220 may verify access rights for device and user using interaction and verification parameters (e.g. location, user, and device information). The aggregate network sensor system 300 may be configured to operate autonomously processing entity interactions and verification parameters on sensor module 350 and verifying access rights based on use case and multiple verification parameters checks as described in FIGS. 1, 2A, and 2B. If requested by the aggregate server 250 or service provider 220, at blocks 425 and 427 the aggregate network sensor system 300 or aggregate server 250 may request and collect additional primary or secondary verification parameters from current user or session.

At block 429, the request is processed by the aggregate network sensor system 300, the request is communicated to the aggregate server 250 or service provider 220 to process the request of an authenticated entity. At block 431, upon processing the request by the aggregate server 250, service provider server 220 (e.g. merchant/transaction server), one or more operations are performed by the electronic device of entity 180 or service group 160. At block 433, the aggregate server 250 or aggregate network sensor system 330 notifies the entity 180 of operations performed and prompt the current user or session for additional requests or operations.

The first entity interaction and all subsequent interactions, as well as primary and secondary verification parameters may be collected, streamed or broadcast, and/or recorded at any time (e.g. concurrently with, prior to, or after any block) in process 400. Moreover, at any time (e.g. concurrently with, prior to, or after any block) in process 400, the activity may be collected, stored, updated or allocated within a database of the aggregate server 250 or stored on the aggregate network sensor system 330, one or more servers, electronic devices, as defined by the user, or any combination thereof.

An entity may be a human, pedestrian, vehicle, robot, car, motorcycle, pet, or any animal or device capable of being identified through image recognition, a tag, or embedded or implanted electronic device or sensor for wirelessly connecting to a network or joining a wireless network to be monitored.

An aggregate network sensor system may be any remote computing device. A remote computing device may be a smart device, a smart phone, a vehicle, a tablet, a laptop, a TV, or any electronic device capable of wirelessly connecting to a network or joining a wireless network. The remote computing device may be wirelessly and communicably associated to an individual either through a network or server (e.g. through a user account on the server, or WiFi™ login information), or through visual information collected by the SRV device. The terms remote computing device, individual, and user may be used interchangeably throughout the present disclosure.

The server may be a computer that provides data to other computers. It may serve data to systems on a local area network (LAN) or a wide area network (WAN) over the Internet. The server may comprise of one or more types of servers (e.g. a web server or file server), each running its own software specific to the purpose of the server for sharing services, data, or files over a network. The server may be any computer configured to act as a server (e.g. a desktop computer, or single or multiple rack-mountable servers) and accessible remotely using remote access software.

Proximity determination may be made by using a combination of visual, motion, and audio information. The sensor components or sensor modules, server, remote computing device may define a virtual perimeter for a real-world geographic area. The aggregate network sensor system or aggregate server may also respond to geofencing triggers. Geofencing may be accomplished using location aware devices through, for example, GPS, RFID technology, wireless network connection information, cellular network connection information, etc. Visual, motion, and audio information may be collected by the aggregate network sensor system or aggregate server to substantiate an entity/service group/individual(s)/computing device(s) physical location.

The network may be a network of computers, a local area network (LAN), a wide area network (WAN), or an Intranet, or a network of networks, for example, the Internet. Moreover, various interfaces may be used to connect to the network such as cellular interfaces, WiFi™ interfaces, Infrared interfaces, RFID interfaces, ZigBee interfaces, Bluetooth interfaces, Ethernet interfaces, coaxial interfaces, optical interfaces, or generally any communication interface that may be used for device communication. The purpose of the network is to enable the sharing of files and information between multiple systems.

The term "within a proximity", "a vicinity", "within a vicinity", "within a predetermined distance", and the like may be defined between about 10 meters and about 2000 meters. The term "coupled" is defined as connected, whether directly or indirectly through intervening components, and is not necessarily limited to physical connections. The connection may be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder but may have one or more deviations from a true cylinder. The term "comprising," when utilized, means "including, but not necessarily limited to"; it specifically indicates open-ended inclusion or membership in the so-described combination, group, series and the like.

The term "a predefined distance" may be defined as the distance of an approaching individual as the individual nears one or more aggregate network sensor system, or a traceable object used in determining environmental features and/or conditions. The predefined distance may be defined as between about 1 meter and about 2000 meters.

The terms "predefined" or "predetermined" period of time may be defined to be between about 0.5 second to about 10 minutes.

Those of skill in the art will appreciate that the foregoing disclosed systems and functionalities may be designed and configured into computer files (e.g. RTL, GDSII, GERBER, etc.) stored on computer-readable media. Some or all such files may be provided to fabrication handlers who fabricate devices based on such files. Resulting products include semiconductor wafers that are separated into semiconductor dies and packaged into semiconductor chips. The semiconductor chips are then employed in devices, such as, an IoT system, the SRV device, or a combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor, and the storage medium may reside as discrete components in a computing device or user terminal.

Further, specific details are given in the description to provide a thorough understanding of the embodiments. However, embodiments may be practiced without these specific details. For example, well-known circuits, processes, algorithms, structures, and techniques have been shown without unnecessary detail to avoid obscuring the embodiments. This description provides example embodiments only and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Where applicable, various embodiments provided by the present disclosure may be implemented using hardware, software, or combinations of hardware and software. In addition, where applicable, the various hardware components and/or software components, set forth herein, may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software or application, in accordance with the present disclosure, such as program code and/or data, may be stored on one or more computer-readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation, or a component may also mean the processor being programmed to monitor and control the operation or the processor being operable to monitor and control the operation. Likewise, a processor configured to execute code may be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the present disclosure, the disclosure, the present disclosure, other variations thereof and alike are for convenience and do not imply that a disclosure relating to such phrase(s) is essential to the present disclosure or that such disclosure applies to all configurations of the present disclosure. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

The embodiments shown and described above are only examples. Many details are often found in the art such as the other features of an image device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed:

1. An aggregate server comprising:
a network communication interface;
at least one memory;
a user device communicably coupled to the network communication interface;
one or more service servers communicably coupled to the network communication interface;
a processor, coupled to the at least one memory, the processor is configured to:
receive one or more request parameters from the user device and one or more authentication factors from an entity, wherein the request parameter comprises of device identification parameters used for identifying the user device, an entity interaction used at least in part for verifying the identity of the entity, and at least one of: entity identification parameters, environmental features, and environmental activity;
receive, from the user device, the entity interaction as a first authentication factor, wherein the entity interaction comprises of one or more proximity interactions by the entity that provide visual information, audio information, or both, from the surrounding environment for identifying the entity;
receive, from the user device or entity input to the user device, the device identification parameters as a second authentication factor;
identify a first service server based on the first authentication factor for entity authentication, wherein, upon receiving the entity identification from the entity interaction, the first service server identifies a first authentication file for user authentication, compares the first authentication factor with a first authentication file, and identifies a first rule set, from among a plurality of rule sets defining requirements to identify the entity, based at least on one or more of: the request parameter, entity identification, or the device identification parameters;
wherein, based on the first rule set, the first service server obtains one or more verification parameters from the identified first authentication file for authentication as reference factors, at least one obtained verification parameter corresponding to one or more of: visual information, audible information, biometric information, voice information, or structural properties of the entity;
authenticate the entity as a valid user based on a successful comparison of the one or more obtained reference factors to a corresponding one or more of the entity authentication factors received for authentication;
identify a second service server based on the second authentication factor for device authentication, wherein, upon receiving the device identification parameters, the second service server identifies a second authentication file for device authentication, compares the second authentication factor with a second authentication file, and identifies a second rule set, from among a plurality of rule sets defining requirements to identify the device, based at least on one or more of: the request parameter, entity identification, or the device identification parameters;
identify a rules list from the second rule set based on the one or more request parameters, the rules list determining the device operations list for the user device, and the collected one or more request parameters and entity authentication determining the device operations allowed for the valid user;
wherein upon meeting a threshold of a level of authentication based on the rules list for the user device and the collected request parameters from the user device, transmitting data via the network communication interface, in response to the authentication of the entity as the valid user, to enable completion of the request parameter of the entity for operating the user device to provide to the entity at least one of: a service request, a product request, an operation, transaction, or location access;
wherein when the threshold of the level of authentication is not met based on the rules list for the user device and the collected request parameters from the user device, requesting from the first service server, the second service server, or another service server additional device identification parameters for device identification, entity identification parameters for entity identification, or both to meet the required threshold of the level of authentication; and
wherein the additional entity identification parameters comprises of at least one of: real or government identification, speech recognition, biometric recognition, image recognition, voice recognition, structural features or properties of the entity, and a residential address.

2. The aggregate server of claim 1, wherein the user device is at least one of: a smart home device, an IoT device, a smart security device, a mobile device, a wearable device, an autonomous or semiautonomous robot or vehicle, a camera, a wireless user device, and a remote computing device.

3. The aggregate server of claim 2, wherein the device identification of the user device is received by the aggregate server, and wherein the device identification is selected from at least one of: an electronic serial number (ESN), a device id (DID), a mobile equipment identifier (MEID), an international mobile subscriber identity (IMSI), and a media access control (MAC) address, a device location, and device ownership information.

4. The aggregate server of claim 3, wherein the verification parameters of the entity are obtained by the user device, the verification parameters being stored on one or more authentication files on the aggregate server.

5. The aggregate server of claim 4, wherein the aggregate server stores data regarding the request parameter and one or more authentication factors to form an interaction and verification history; and updates the data upon receiving one difference in the stored one or more authentication factors for the valid user.

6. The aggregate server of claim 5, wherein the aggregate server requests additional authentication factors from the entity through the user device or accesses one or more additional authentication factors from the stored interaction and verification history to enable completion of the request parameter of the entity.

7. The aggregate server of claim 5, wherein the aggregate server requests additional authentication factors from the entity through a second user device or accesses one or more additional authentication factors from the stored interaction and verification history on the second user device to enable completion of the request parameter of the entity.

8. The aggregate server of claim 5, wherein the aggregate server requests additional authentication factors from the entity through a third service server or accesses one or more additional authentication factors from the stored interaction and verification history on the third service server to enable completion of the request parameter of the entity.

9. A method comprising:
receiving one or more request parameters and one or more authentication factors from a current user;
receiving a user identification as a first authentication factor through one or more proximity interactions by the current user that provide visual information, audio information, or both, from the surrounding environment for identifying the user;
receiving a device identification as a second authentication factor;
identifying a first authentication file based on the received user identification and a second authentication file based on the received device identification of the current user;
comparing the first authentication factor with the first authentication file and comparing the second authentication factor with the second authentication file;
identifying a first rule set from a plurality of rule sets defining requirements for user authentications;
identifying a second rule set from a plurality of second rule sets defining requirements for device identification;
identifying a rules list from the second rule set based on the one or more request parameters;
obtaining, based on the first rule set, one or more verification parameters from the identified authentication file for authentication as reference factors, at least one obtained verification parameter corresponding to one or more of: visual information, audible information, biometric information, voice information, or structural properties of the current user;
authenticating the current user as a valid user based on a successful comparison of the one or more obtained reference factors to a corresponding one or more of the user authentication factors received for authentication; and
wherein upon meeting a threshold of a level of authentication based on the rules list, and in response to the authentication of the current user as the valid user, performing an operation based on the one or more request parameters of the current user to provide at least one of: a service request, a product request, an operation, transaction, or location access;
wherein when the threshold of the level of authentication is not met based on the rules, requesting additional device identification parameters for device identification, user identification parameters for user identification, or both to meet the required threshold of the level of authentication; and
wherein the additional user identification parameters comprises of at least one of: real or government identification, speech recognition, biometric recognition, image recognition, voice recognition, structural features or properties of the current user, and a residential address.

10. The method of claim 9, wherein the device identification is selected from at least one of: an electronic serial number (ESN), a device id (DID), a mobile equipment identifier (MEID), an international mobile subscriber identity (IMSI), and a media access control (MAC) address, a device location, and device ownership information.

11. The method of claim 10, wherein the request parameter and the one or more authentication factors are retrieved from a database to verify the user request, and the database is updated with an interaction and verification history of the current user.

12. The method of claim 11, further comprising requesting additional authentication factors from the current user or accessing one or more authentication factors from the stored interaction and verification history to enable completion of the request parameter of the current user.

13. The method of claim 11, further comprising requesting additional authentication factors from the entity through a second user device or accesses one or more additional authentication factors from the stored interaction and verification history on the second user device to enable completion of the request parameter of the entity.

14. The method of claim 11, further comprising requesting additional authentication factors from the entity through a third service server or accesses one or more additional authentication factors from the stored interaction and verification history on the third service server to enable completion of the request parameter of the entity.

15. A non-transitory machine-readable medium comprising instructions stored therein, which, when executed by one or more processors of a processing system cause the one or more processors to perform operations comprising:
receiving one or more request parameters and one or more authentication factors from a current user;
receiving a user identification as a first authentication factor through one or more proximity interactions by the current user that provide visual information, audio information, or both, from the surrounding environment for identifying the user;
receiving a device identification as a second authentication factor;
identifying a first authentication file based on the received user identification and a second authentication file based on the received device identification of the current user;
comparing the first authentication factor with the first authentication file and comparing the second authentication factor with the second authentication file;
identifying a first rule set from a plurality of rule sets defining requirements for user authentications;
identifying a second rule set from a plurality of second rule sets defining requirements for device identification;
identifying a rules list from the second rule set based on the one or more request parameters;
obtaining, based on the first rule set, one or more verification parameters from the identified authentication file for authentication as reference factors, at least one obtained verification parameter corresponding to one or more of: visual information, audible information, biometric information, voice information, or structural properties of the current user;
authenticating the current user as a valid user based on a successful comparison of the one or more obtained reference factors to a corresponding one or more of the user authentication factors received for authentication; and
wherein upon meeting a threshold of a level of authentication based on the rules list, and in response to the authentication of the current user as the valid user, performing an operation based on the one or more request parameters of the current user to provide at least one of: a service request, a product request, an operation, transaction, or location access;

wherein when the threshold of the level of authentication is not met based on the rules, requesting additional device identification parameters for device identification, user identification parameters for user identification, or both to meet the required threshold of the level of authentication; and wherein the additional user identification parameters comprises of at least one of: real or government identification, speech recognition, biometric recognition, image recognition, voice recognition, structural features or properties of the current user, and a residential address.

16. The non-transitory machine-readable medium of claim 15, wherein the device identification is selected from at least one of: an electronic serial number (ESN), a device id (DID), a mobile equipment identifier (MEID), an international mobile subscriber identity (IMSI), and a media access control (MAC) address, a device location, and device ownership information.

17. The non-transitory machine-readable medium of claim 16, wherein the request parameter and the one or more authentication factors are retrieved from a database to verify the user request, and the database is updated with an interaction and verification history of the current user.

18. The non-transitory machine-readable medium of claim 17, further comprising requesting additional authentication factors from the current user or accessing one or more authentication factors from the stored interaction and verification history to enable completion of the request parameter of the current user.

19. The non-transitory machine-readable medium of claim 17, further comprising requesting additional authentication factors from the entity through a second user device or accesses one or more additional authentication factors from the stored interaction and verification history on the second user device to enable completion of the request parameter of the entity.

20. The non-transitory machine-readable medium of claim 17, further comprising requesting additional authentication factors from the entity through a third service server or accesses one or more additional authentication factors from the stored interaction and verification history on the third service server to enable completion of the request parameter of the entity.

* * * * *